US008822626B2

(12) United States Patent
Vyakaranam et al.

(10) Patent No.: US 8,822,626 B2
(45) Date of Patent: *Sep. 2, 2014

(54) SILYL-TERMINATED POLYMERS

(75) Inventors: Kameswara R. Vyakaranam, Pearland, TX (US); Ling Zhang, Missouri City, TX (US); William A. Koonce, Pearland, TX (US); Sara Arshad, West Springfield, MA (US); Venkat S. Minnikanti, Pearland, TX (US); Dwight D. Latham, Clute, TX (US); Phillip S. Athey, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/806,962

(22) PCT Filed: Jun. 28, 2011

(86) PCT No.: PCT/US2011/042195
§ 371 (c)(1),
(2), (4) Date: Dec. 26, 2012

(87) PCT Pub. No.: WO2012/003187
PCT Pub. Date: Jan. 5, 2012

(65) Prior Publication Data
US 2013/0096274 A1  Apr. 18, 2013

Related U.S. Application Data

(60) Provisional application No. 61/359,992, filed on Jun. 30, 2010.

(51) Int. Cl.
| C08G 18/10 | (2006.01) |
| C08G 18/28 | (2006.01) |
| C08G 18/18 | (2006.01) |
| C08G 18/42 | (2006.01) |
| C08G 18/48 | (2006.01) |
| C08G 18/50 | (2006.01) |
| C08G 18/80 | (2006.01) |
| C08G 18/70 | (2006.01) |

(52) U.S. Cl.
CPC ............ *C08G 18/70* (2013.01); *C08G 2190/00* (2013.01); *C08G 18/289* (2013.01); *C08G 18/1875* (2013.01); *C08G 18/4288* (2013.01); *C08G 18/4866* (2013.01); *C08G 18/5024* (2013.01); *C08G 18/809* (2013.01); *C08G 18/10* (2013.01)
USPC .................. 528/85; 528/25; 528/31; 528/44; 528/68

(58) Field of Classification Search
None
See application file for complete search history.

(56) References Cited

U.S. PATENT DOCUMENTS

| 5,554,709 | A | 9/1996 | Emmerling et al. | |
| 6,498,210 | B1 | 12/2002 | Wang et al. | |
| 6,512,086 | B2 * | 1/2003 | Greco et al. | 528/480 |
| 7,569,653 | B2 | 8/2009 | Landon | |
| 2007/0060735 | A1 | 3/2007 | Banevicius et al. | |
| 2007/0129527 | A1 | 6/2007 | Griswold | |
| 2008/0125539 | A1 * | 5/2008 | Mack | 524/588 |
| 2009/0124751 | A1 | 5/2009 | Lucas et al. | |
| 2009/0171040 | A1 | 7/2009 | Griswold | |
| 2010/0081757 | A1 | 4/2010 | Braun et al. | |

FOREIGN PATENT DOCUMENTS

| EP | 1146062 A1 | 10/2001 |
| JP | 5-125175 A * | 5/1993 |
| WO | 2007067531 A1 | 6/2007 |
| WO | 2009009654 A1 | 1/2009 |
| WO | 2009085285 A1 | 7/2009 |

OTHER PUBLICATIONS

Abstract for JP 5-125175 A (May 1993).*
PCT/US2011/042195, International Search Report.
PCT/US2011/042195, International Preliminary Report on Patentability.
PCT/US2011/042195, Written Opinion of the International Searching Authority.

* cited by examiner

Primary Examiner — Marc Zimmer

(57) ABSTRACT

Embodiments of the invention provide for compositions including a crosslinkable silane-terminated polymer having at least one crosslinkable silyl group in each molecule. The crosslinkable silane-terminated polymer comprises a reaction product of at least a isocyanate capped hydrosilylated polymer and a polyol having a nominal functionality of at least 2 which is at least one of a polycarbonate polyol, a natural oil based polyol, a polyoxyalkyleneamine, a difunctional aromatic amine, a polybutyloxide polyether polyol, and a polytetramethylene glycol.

20 Claims, No Drawings ental of the invention relate to silyl-modified
SILYL-TERMINATED POLYMERS

CROSS-REFERENCE TO RELATED APPLICATIONS

This application claims the benefit of U.S. Provisional Patent Application No. 61/359,992, filed on Jun. 30, 2010, and fully incorporated herein by reference.

FIELD OF THE INVENTION

Embodiments of the invention relate to silyl-modified polymers and methods of producing same.

BACKGROUND OF THE INVENTION

Crosslinkable silyl group-containing polymers are widely used as raw material polymers in sealing materials, adhesives, coating materials and the like for architectural or industrial use. Such crosslinkable silyl group-containing polymers may be produced according to various methods, such as hydrosilyation of vinyl terminated polyethers via Williamson's ether synthesis, aminosilane reaction with isocyanate terminated preoplymer polyethers, or isocyanatosilane reaction with hydroxyl-terminated prepolymer polyethers. However, some of the methods (particularly the aminosilane reaction with isocyanate terminated preoplymer polyethers and isocyanatosilane reaction with hydroxyl-terminated prepolymer polyethers) may result in products having high viscosities which may require large amounts of diluting solvents during product formulation. Furthermore, the Williamson's ether synthesis may produce salts as byproducts which may be required to be removed, thus adding a process step.

Therefore there is a need for crosslinkable silyl group-containing polymers that may be made using non-typical polyether polyols.

SUMMARY OF THE INVENTION

Embodiments of the invention provide for crosslinkable silyl group-containing polymers that may be made using non-typical polyether polyols.

In one embodiment, a composition comprising a crosslinkable silane-terminated polymer having at least one crosslinkable silyl group in each molecule is presented. The crosslinkable silane-terminated polymer comprises a reaction product of at least a polyol having a nominal functionality of at least 2 which is at least one of a polycarbonate polyol, a natural oil based polyol, a polyoxyalkyleneamine, a difunctional aromatic amine, a polybutyloxide polyether polyol, and a polytetramethylene glycol and a isocyanate capped hydrosilylated polymer. The isocyanate capped hydrosilylated polymer comprises a reaction product of at least one isocyanate and a hydrosilylated polymer reacted at an isocyanate index of between about 100 and about 250. The hydrosilylated polymer comprises a reaction product of a hydrosilylation reaction having a hydrosilylation efficiency of at least about 70% as determined by $^1$H-NMR and comprising the reaction of at least a) a polymer having at least one unsaturated group and at least one alcoholic hydroxyl group in each molecule and having a number average molecular weight of between about 100 and about 5000 and b) a compound having a hydrogen-silicon bond and a crosslinkable silyl group in each molecule.

In another embodiment of the invention, a method of producing a composition comprising a crosslinkable silane-terminated polymer having at least one crosslinkable silyl group in each molecule is presented. The method includes: providing a polymer having at least one unsaturated group and at least one alcoholic hydroxyl group in each molecule and having a number average molecular weight of between about 100 and about 5000, adding to the polymer a compound having a hydrogen-silicon bond and a crosslinkable silyl group in each molecule and a hydrosilylation catalyst to thereby carry out a hydrosilylation reaction to form a composition comprising hydrosilylated polyoxyalkylene polymers, wherein the hydrosilylation reaction has a hydrosilylation efficiency of at least about 70% as determined by $^1$H-NMR, capping the hydrosilylated polyoxyalkylene polymers by exposing the hydrosilylated polymer to at least one isocyanate at an isocyanate index of between about 100 and about 250 to form a composition comprising isocyanate capped hydrosilylated polymers, and reacting the isocyanate capped hydrosilylated polymer with a polyol having a nominal functionality of at least 2 and which comprises at least one of a polycarbonate polyol, a natural oil based polyol, a polyoxyalkyleneamine, a difunctional aromatic amine, a polybutyloxide polyether polyol, and a polytetramethylene glycol to form the composition comprising a crosslinkable silane-terminated polymer.

DESCRIPTION OF EMBODIMENTS OF THE INVENTION

Embodiments of the invention provide for silyl-terminated polymers (STP) made using various kinds of polyols, and methods of making same. In embodiments of the invention, an STP may be obtained by the hydrosilylation of a polymer having at least one unsaturated group and at least one alcoholic hydroxyl group in each molecule. The hydrosilylated polymers may then be capped by exposing the hydrosilylated polymer to at least one isocyanate to form a composition including isocyanate capped hydrosilylated polymers. The isocyanate capped hydrosilylated polymers may then be reacted with a polyol having a nominal functionality of at least 2 to form the STP.

The polymer having at least one unsaturated group and at least one alcoholic hydroxyl group is not particularly restricted, and may include any polymer as long as they include at least one unsaturated group (such as a carbon-carbon double bond or carbon-carbon triple bond) and at least one alcoholic hydroxyl group.

The polymer having at least one unsaturated group and at least one alcoholic hydroxyl group in each molecule may have a number average molecular weight of between about 100 and about 5000. All individual values and subranges from 100 to 5000 are included herein and disclosed herein; for example, the number average molecular weight can be from a lower limit of 100, 200, 300, 400, 500, 600, 700, 800, 900, 1000, 1250, 1500, or 1750 to, independently, an upper limit of 1000, 1250, 1500, 1750, 2000, 2500, 3000, 3500, 4000, 4500, or 5000.

In one embodiment, the polymer having at least one unsaturated group and at least one alcoholic hydroxyl group in each molecule may be a polyoxyalkylene polymer as described in co-pending U.S. Provisional Patent Application No. 61/348, 996, filed May 27, 2010, and entitled "Methods for Producing Crosslinkable Silyl Group-Containing Polyoxyalkylene Polymers," which is hereby incorporated by reference in its entirety.

In one embodiment, the polymer having at least one unsaturated group and at least one alcoholic hydroxyl group in each molecule may be made by subjecting an epoxy compound to ring opening polymerization using an unsaturated group- and active hydrogen-containing compound as a polymerization initiator in presence of a catalyst. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The active hydrogen-containing compound that may be used as a polymerization initiator is not restricted but may be any of those compounds which are applicable in association with double metal cyanide complexes, such as, for example, compounds including an alcoholic hydroxyl, phenolic hydroxyl or carboxyl group.

The alcoholic hydroxyl-containing compound may include allyl alcohol, methallyl alcohol, trimethylolpropane monoallyl ether, trimethylolpropane diallyl ether, glycerol monoallyl ether, glycerol diallyl ether; ethylene oxide adducts or propylene oxide adducts thereof and like compounds containing at least one unsaturated group and at least one alcoholic hydroxyl group in each molecule; hydroxyl-terminated hydrocarbon compounds such as hydroxyl-terminated polybutadiene; and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

In one embodiment, the polymer having at least one unsaturated group and at least one alcoholic hydroxyl group in each molecule may be a propylene glycol monoallyl ether having a number average molecular weight between about 600 and about 100, and an OH number of between about 50 and about 90.

The polymer having at least one unsaturated group and at least one alcoholic hydroxyl group in each molecule may be hydrosilylated by reacting the polymer with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

$$H-(Si(R^1_{2-b})(X_b)O)_m Si(R^2_{3-a})X_a \quad (I)$$

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO-$ and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of $-SiR^1_{2-b})(X_b)O-$ groups may be the same or different with each other or one another; and m represents an integer from 0 to 19 provided that the relation $a+\Sigma b \geq 1$ should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum $(a+\Sigma b)$ is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (I) may include the compounds represented by the general formula (II):

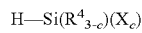

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO-$ and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis (methyl ethyl ketoximato)methylsilane and tris(acetoximato) silane; alkenyloxysilanes such as methylisopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After the reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like are preferred, $H_2PtCl_6 \cdot 6H_2O$, platinum-vinylsiloxane complexes and platinum-olefin complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3,3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 part by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; haogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or between the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

In embodiments of the invention the polymers having at least one unsaturated group and at least one alcoholic hydroxyl group in each molecule are hydrosilylated with a hydrosilylation efficiency of at least about 70%, such as between about 70% and about 100%. All individual values and subranges from about 70 to about 100 are included herein and disclosed herein; for example, the hydrosilylation efficiency can be from a lower limit of about 70, 75, 80, 90, or 92%, to, independently, an upper limit of about 80, 85, 90, 92, 94, 95, 96, 98, 99, or 100%. This includes polymers hydrosilylated with a hydrosilylation efficiency of 80 to 95% and further includes hydrosilylated polymers capped with a hydrosilylation efficiency of 85 to 95%. As used herein, the "hydrosilylation efficiency"=[100×((number of unsaturation groups on the polyol hydrosilylated)/(total number of unsaturation groups on the polyol that were initially available for hydrosilylation)], and may be measured using $^1$H-NMR.

The hydrosilylated polymers having at least one crosslinkable silyl group and at least one hydroxyl group in each molecule (hereinafter referred to as "hydrosilylated polymer") as produced by the above described process can react with water or atmospheric moisture to give crosslinked cured products and therefore is useful as a raw material or raw material intermediate for sealing, adhesive, coating and like materials or compositions for architectural or industrial use. However, the high remaining hydroxyl group percentage of this polymer having at least one crosslinkable silyl group and at least one hydroxyl may be capped with a polyisocyanate compound.

Among the capping agents usable in the practice of the embodiments of the invention, the polyisocyanate compounds, namely compounds having two or more isocyanato groups in each molecule, include, but are not limited to, aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, saturated analogues of the above mentioned aromatic isocyanates, and mixtures thereof.

The coupling reaction may be performed at an isocyanate index of between about 100 and about 250. All individual values and subranges from 100 to 250 are included herein and disclosed herein; for example, the isocyanate index can be from a lower limit of 100, 105, 110, 125, 140, 150, 160, 170, 175, 180, 190, 200, 225, to, independently, an upper limit of 150, 175, 200, 225, or 250. In some embodiments the index may be between about 160 and about 200, between about 140 and about 170, or between about 150 and about 180.

When, in the practice of the embodiments of the invention, the hydrosilylated polymer is reacted with a coupling agent such as a compound having two or more isocyanato groups in each molecule, it is not always necessary to use a catalyst. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Preferred as the urethane formation reaction catalysts usable in effecting the coupling reaction using a polyisocyanate compound because of their high activity are tin catalysts such as stannous octylate, stannous stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl 3-mercaptopropionate), dibutyltin bis (isooctyl thioglycolate), dioctyltin oxide, dioctyltin dilaurate, dioctyltin diacetate and dioctyltin diversatate. Further, it is preferable to use catalysts low in activity against crosslinkable silyl groups and, thus, for example, sulfur atom-containing tin catalysts such as dibutyltin bis(isononyl 3-mercaptopropionate) and dibutyltin bis(isooctyl thioglycolate) are particularly preferred.

The isocyanate capped polymers may be coupled with a polyol having a nominal functionality of at least 2 to form the final silyl-terminated polymers. The polyol may be at least one of a polycarbonate polyol, a natural oil based polyol, a polyoxyalkyleneamine, a difunctional aromatic amine, a polybutyloxide polyether polyol, a polytetramethylene glycol (PTMEG or poly THF), or combinations thereof.

Suitable polycarbonate polyols are not particularly restricted, and may include any polycarbonate polyol known in the art, such as those described in U.S. Pat. Nos. 5,621,065; 6,767,986; 6,818,784; and 7,238,825 and in copending U.S. Provisional Patent Application No. 61/324,076, the content of which has been incorporated herein by reference. Typically, a dialkyl carbonate, such as for example dimethyl carbonate, is reacted with a diol component, which may be an aliphatic diol or a mixture of aliphatic diols, or a mixture of aliphatic diols with lactones, with the addition of a transesterification catalyst. The reaction may be performed at atmospheric or elevated pressures, such as for example at a pressure of 3 to 6 bar, and at temperatures of 50 to 200° C., preferably 100 to 200° C. The dialkyl carbonate may be continuously introduced into the liquid phase of the reaction mixture and alcohol, such as methanol if dimethyl carbonate is used, may continuously be removed from the reaction mixture by distillation. Polycarbonate polyols are commercially available from for example Asahi Kasei Chemicals Corporation under the trade name DURANOL, Perstop Chemicals under the trade designation OXYMER, and Arch Chemicals under the trade designation POLY CD.

Natural oil based polyols (NOBP) are polyols based on or derived from renewable feedstock resources such as natural plant vegetable seed oils. The renewable feedstock resources may also include genetically modified (GMO) plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least about 85 percent by weight unsaturated fatty acids. Examples of preferred vegetable oils include, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Examples of animal products include lard, beef tallow, fish oils and mixtures thereof. Additionally, oils obtained from organisms such as algae may also be used. A combination of vegetable, algae, and animal based oils/fats may also be used.

For use in the production of polyurethane products, the natural material may be modified to give the material isocyanate reactive groups or to increase the number of isocyanate reactive groups on the material. Preferably such reactive groups are a hydroxyl group.

The modified natural oil derived polyols may be obtained by a multi-step process wherein the animal or vegetable oils/fats are subjected to transesterification and the constituent fatty acids recovered. This step is followed by hydroformylating carbon-carbon double bonds in the constituent fatty acids followed by reduction to form hydroxymethyl groups. Suitable hydroformylation/reduction methods are described in U.S. Pat. Nos. 4,731,486, 4,633,021, and 7,615,658, for example. The hydroxymethylated fatty acids or esters thereof are herein labeled "monomers" which form one of the building blocks for the natural oil based polyol. The monomers may be a single kind of hydroxymethylated fatty acid and/or hydroxymethylated fatty acid methyl ester, such as hydroxymethylated oleic acid or methylester thereof, hydroxymethylated linoleic acid or methylester thereof, hydroxymethylated linolenic acid or methylester thereof, α- and γ-linolenic acid or methyl ester thereof, myristoleic acid or methyl ester thereof, palmitoleic acid or methyl ester thereof, oleic acid or methyl ester thereof, vaccenic acid or methyl ester thereof, petroselinic acid or methyl ester thereof, gadoleic acid or methyl ester thereof, erucic acid or methyl ester thereof, nervonic acid or methyl ester thereof, stearidonic acid or methyl ester thereof, arachidonic acid or methyl ester thereof, timnodonic acid or methyl ester thereof, clupanodonic acid or methyl ester thereof, cervonic acid or methyl ester thereof, or hydroxymethylated ricinoleic acid or methylester thereof. In one embodiment, the monomer is hydroformulated methyloelate. Alternatively, the monomer may be the product of hydroformulating the mixture of fatty acids recovered from transesterifaction process of the animal or vegetable oils/fats to form hydroxymethylated fatty acids or methyl esters thereof. In one embodiment the monomer is hydroxymethylated soy bean fatty acids or methyl esters thereof which may have an average OH functionality of between about 0.9 and about 1.1 per fatty acid, preferably, the functionality is about 1. In another embodiment the monomer is castor bean fatty acids. In another embodiment, the monomer may be a mixture of selected hydroxymethylated fatty acids or methylesters thereof.

Alternatively, the NOBP comprises certain polyols that comprise mer units based on methyl 9-(10)-hydroxymethylstearate (MHMS polyol). The embodiments of the invention may include NOBPs that have a relatively high content of methyl 9 (10) hydroxymethylstearate (hereinafter referred to as "MHMS"). Such NOBPs may comprise fatty acid based mer units wherein at least about 50, at least about 60, at least about 70, at least about 80, at least about 85, at least about 90, or at least about 95 weight percent of the fatty acid based mer units are from methyl 9 (10) hydroxymethylstearate. Methyl hydroxymethylstearate (CAS registry number 346706-54-5) is obtained by purchase, direct synthesis or synthesis from natural oils. Synthetic methods include those within the skill in the art and, for instance as disclosed in Behr, Arno; Fiene, Martin; Buss, Christian; Eilbracht, Peter, Hydroaminomethylation of fatty acids with primary and secondary amines—a new route to interesting surfactant substrates. European Journal of Lipid Science and Technology (2000), 102(7), 467-471; or DeWitt, Elmer J.; Ramp, Floyd L.; Backderf, Richard H. Hydroxymethylstearic acid polyester copolymers, U.S. Pat. No. 3,210,325 (1965).

Alternatively, a natural oil that produces fatty acids including oleic acid on saponification, for instance using a base such as sodium hydroxide is saponified. Then the fatty acids are purified or refined by methods within the skill in the art such as wiped film evaporator, distillation apparatus, simulated moving bed (SMB), and the like or combinations thereof to obtain at least about 80 weight percent oleic acid, preferably at least about 85, more preferably at least about 90, most preferably at least about 95 weight percent oleic acid in the resulting purified oil.

Alkyl esters are then optionally formed from the resulting fatty acids by any effective process such as those known in the art to produce hydroxyalkylesters of the fatty acids. For example, the hydroxymethyl group may be introduced by a hydroformylation process as described above.

Alternatively, the fatty acid ester feedstock is obtained by transesterifying a seed oil that contains oleic acid or purified oleic acid with a lower alkanol. Transesterification produces the corresponding mixture of fatty acid esters of the lower alkanol. Advantageously, the lower alcohol has from 1 to about 15 carbon atoms. The carbon atoms in the alcohol segment are optionally arranged in a straight-chain or alternatively in a branched structure, and are optionally inertly substituted. The alcohol may be a straight-chain or a branched $C_{1-8}$ alkanol, or a $C_{1-4}$ alkanol. In certain embodiments, the lower alkanol is selected from methanol, ethanol, and isopropanol.

Any known transesterification method can be suitably employed, provided that the ester products of the lower alkanol are achieved. The art adequately discloses transesterification (for example, methanolysis, ethanolysis) of seed oils; for example, refer to WO 2001/012581, DE 19908978, and BR 953081. Typically, in such processes, the lower alkanol is contacted with alkali metal, preferably sodium, at a temperature between about 30° C. and about 100° C. to prepare the corresponding metal alkoxide. Then, the seed oil is added to the alkoxide mixture, and the resulting reaction mixture is heated at a temperature between about 30° C. and about 100° C. until transesterification occurs.

Alternatively, the hydroxymethylated ester of fatty acids from a seed oil having a lower than desired oleic acid ester content are produced and the resulting hydroxymethylated fatty acid esters are purified by means within the skill in the art to contain the desired levels of oleic acid hydroxymethyl ester. Such methods include that disclosed in copending application "PURIFICATION OF HYDROFORMYLATED AND HYDROGENATED FATTY ALKYL ESTER COMPOSITIONS" filed Jun. 20, 2008, application number PCT/US08/67585, published as WO 2009/009271, which is incorporated by reference herein to the extent permitted by law. Alternatively, the polyol is prepared from reactions of purified chemicals, for instance the reaction of oleic acid with carbon monoxide via hydroformylation and subsequent hydrogenation to produce hydroxymethyl methylstearate followed by formation of the polyol.

The at least one NOBP may be the polyol obtained by reacting the hydroxymethylated monomer with an appropriate initiator compound to form a polyester or polyether/polyester polyol. Such a multi-step process is commonly known in the art, and is described, for example, in PCT publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil derived polyols may be any initiator used in the production of conventional petroleum-based polyols. The initiator may be selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis (hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In one embodiment, the initiator is a mixture of 1,3-cyclohexanedimethanol and 1,4-cyclohexanedimethanol and is commercially available under the trade name UNOXOL from The Dow Chemical Company which is an approximate 1:1 mixture of (cis, trans) 1,3-cyclohexanedimethanol and (cis, trans) 1,4-cyclohexanedimethanol. Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1, 2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

In one embodiment, the initiators are alkoxylated with ethylene oxide, propylene oxide, or a mixture of ethylene and at least one other alkylene oxide to give an alkoxylated initiator with a molecular weight between about 200 and about 6000.

The polyoxyalkyleneamine may be defined by the general formula $H_2NCH(CH_3)CH_2O(CH_2CH(R)O)_nCH_2CH(CH_3)NH_2$, wherein R in each $CH_2CH(R)O$ unit is either H, forming an ethylene oxide unit, or $CH_3$, forming a propylene oxide unit, and n may be from about 1 to about 70. In one example, n is from 1 to 2 and R is $CH_3$. One such suitable commercially available polyoxyalkylene diamine is JEFFAMINE D-230, available from Huntsman International LLC. In another example, n is from 4 to 5 and R is $CH_3$. One such suitable commercially available polyoxyalkylene diamine is JEFFAMINE D-400. In another example, n is about 32 and R is $CH_3$. One such suitable commercially available diamine is JEFFAMINE D-2000. In another example, n is about 67 and R is $CH_3$. One such suitable commercially available diamine is JEFFAMINE D-4000. In yet another example, n is about 41 and R is H. One such suitable commercially available diamine is JEFFAMINE XTJ-502. In still another example, n is 2 and R is H. One such suitable commercially available polyoxyalkylene diamine is JEFFAMINE XTJ-511.

The polyoxyalkyleneamine may be a polyoxyalkylene triamine, and may be ethylene, propylene, or butylene oxide based, or mixtures thereof and may be prepared by reaction thereof with a triol initiator, e.g., glycerin or trimethylolpropane, followed by amination of the terminal hydroxyl groups. Examples of such polyoxyalkylene triamines are JEFFAMINE T-403, JEFFAMINE T-5000, and JEFFAMINE XTJ-509.

Suitable aromatic diamines include 4,4'-methylene bis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol, 2,4-diethyl-6-methyl-1,3-benzenediamine, 4,4'-methylenbis(2,6-diethylbenzeneamine), dimethylthiotoluenediamine (DMTDA) such as E-300 from Albermarle Corporation (a mixture of 3,5-dimethylthio-2,6-toluenediamine and 3,5-dimethylthio-2,4-toluenediamine), diethyltoluenediamine (DETDA) such as E-100 Ethacure from Albemarle (a mixture of 3,5-diethyltoluene-2,4-diamine and 3,5-diethyltoluene-2,6-diamine). Aromatic diamines have a tendency to provide a stiffer (i.e., having a higher Mooney viscosity) product than aliphatic or cycloaliphatic diamines. The aromatic diamines may be used either alone or in a mixture.

Suitable polybutyloxide polyether polyols may be made through the butyleneoxide alkoxylation of the same initiators used to make the NOBP, using a DMC catalyst, as described in U.S. Pat. No. 5,482,908. In one embodiment the initator is a 390 MW propylene glycol homopolymer.

Suitable polytetramethylene glycols (PTMEG) are commercially available from Invista under the trade designation TERATHANE or from BASF under the trade designation POLYTHF, and may be prepared by acid-catalyzed polymerization of tetrahydrofuran.

According to the embodiments of the invention, the resulting silyl-terminated polymers may be useful, among other things, to be reacted with one another to further lengthen the molecular chains for uses such as sealants, adhesives, and coatings, and combinations thereof. When silyl polymers are exposed to moisture, for example, the moisture from the atmosphere, the hydrolyzable groups which are bonded to the silicon atoms are hydrolyzed, being replaced by silicon bonded hydroxyl groups. The hydroxyl groups in turn react with each other or with other hydrolyzable groups to form siloxane (Si—O—Si) linkages. By this process the polymer molecules of the composition of the embodiments of the invention are bonded to form an infusible elastomeric material. To avoid premature curing, the compositions of the embodiments of the invention may be stored and maintained in the absence of moisture until cure is desired. Then, when cure is desired, the polymer may be exposed to atmospheric or other moisture.

Furthermore, the reaction of curing of the silyl polymer may be facilitated by use of a silanol condensation catalyst or curing accelerator. Silanol condensation catalysts or accelerators are well known in the art such as those disclosed in U.S. Pat. No. 6,355,127 and include the following: titanic acid esters, such as tetrabutyl titanate, tetrapropyl titanate, and the like; organotin compounds, such as dibutyltin dilaurate, dibutyltin maleate, dibutyltin diacetate, tin octylate, tin naphthenate, reaction products of dibutyltin oxide and phthalic acid esters, dialkyltin diacetyl acetonates, such as dibutyltin bis(acetylacetonate); dialkyltinoxides, such as dibutyltinoxide; organoaluminum compounds, such as aluminum trisacetylacetonate, aluminum trisethylacetonate, and the like; reaction products, such as bismuth salts and organic carboxylic acids, such as bismuth tris(2-ethylhexoate), bismuth tri(neodeconate), and the like; chelate compounds, such as zirconium tetracetylacetonoate, titanium tetracetylacetonate, and the like; amine compounds, such as butylamine, octylamine, dibutylamine, monethanolamine, diethanolamine, triethanolamine, diethylenetriamine, cyclohexylamine, benzylamine, and the like, or their salts with carboxylic acids, and the like. These compounds are not limited; one can use any silanol condensation catalyst which is in general use. These silanol condensation catalysts may be used individually or in combinations. Such catalysts and accelerators include tetrabutyltitanate, dibutyltin dilaurate, dibutyltin bis(acetylacetonate), and the like. The catalyst may be present in an amount of about at least about 0.1 percent by weight of the polymer, at least about 0.5 percent by weight of the polymer, at least about 1 percent by weight of the polymer, at least about 1.5 percent by weight of the polymer, or at least about 2 percent by weight of the polymer and at most about 8 percent by weight of the polymer, at most about 6 percent by weight of the polymer, at most about 5 percent by weight of the polymer, at most about 4 percent by weight of the polymer, or at most about 3.5 percent based on weight of the polymer. Such catalysts may be combined with the polymer by means within the skill in the art during the formulation of the sealant, coating, or adhesive.

The resulting cured silyl polymers are also embodiments of the invention. Similarly, the embodiments of the invention includes the sealants, adhesives, and coatings and other end uses comprising these polymers or prepolymers. Preferred properties for the silyl polymers may differ somewhat for each end use as do other components that are optionally present in compositions suitable for each.

EXAMPLES

The following examples are provided to illustrate the embodiments of the invention, but are not intended to limit the scope thereof. All parts and percentages are by weight unless otherwise indicated.

The following materials were used:

| | |
|---|---|
| Allyl monol | A propylene glycol monoallyl ether having an allylic content of 3.5 wt % (0.998 mol of unsat/mol monol), a number average molecular weight of about 800, and an OH number of 70 or 2.1 wt % OH. |
| JEFFAMINE D-4000 | A difunctional, amine terminated polypropylene glycol having an average molecular weight of 4000, available from Huntsman International LLC. |
| ACCLAIM Polyol 4200 | A difunctional polyether polyol based on propylene oxide with a molecular weight of about 4000 and a hydroxyl number of 28 mg KOH/g, available from Bayer MaterialScience. |
| ACCLAIM Polyol 2200 | A difunctional polyether polyol based on propylene oxide with a molecular weight of about 2000 and a hydroxyl number of 56 mg KOH/g, available from Bayer MaterialScience. |
| BO polyol | A polybutyleneoxide polyether polyol having a number average molecular weight of 4000, an equivalent weight of 1640, and an OH number of 34. It is made through the butyleneoxide alkoxylation of a 390 MW propylene glycol homopolymer using a DMC catalyst, as described in U.S. Pat. No. 5,482,908. |
| NOPB | Natural oil based polyol. Made from monomers obtained from soy using the method disclosed in copending application "PURIFICATION OF HYDROFORMYLATED AND HYDROGENATED FATTY ALKYL ESTER COMPOSITIONS" filed Jun. 20, 2008, application number PCT/US08/67585, published as WO 2009/009271, the content of which has been incorporated herein by reference. The monomer includes about 89 weight % monols (methyl hydroxymethyl stearate), about 6 weight % diols, about 3 weight % cyclic ethers, about 1 weight % methyl stearate, with the balance including methyl palmitate, triols, lactols, lactones, and dimmers. The NOBP is made by reacting the monomers with an initiator which is 1,4-cyclohexane dimethanol using 500 ppm stannous octoate (commercially available from City Chemical Co.) as the catalyst. The molar ratio of monomer to initiator is 12.5/1. NOBP has an average of approximately 2 hydroxyl groups/molecule, an OH number of 33, and number average molecular weight of about 3300. |

-continued

| | |
|---|---|
| DURANOL T5652 | A polycarbonate diol (copolymer of 1,6-hexanediol and caprolactone) and having a molecular weight of 2000, available from Asahi Kasei Chemicals Corporation. |
| Karstedt's catalyst | Platinum-divinyltetramethyldisiloxane and xylene as carrier solvent, the Pt loading in the catalyst is 2 wt %, available from Gelest, Inc. |
| Methyldimethoxysilane | Available from Gelest, Inc. |
| ISONATE* 50 OP | A 50 percent 4,4'-methylene diphenyl isocyanate, 50 percent 2,4'-methylene diphenyl isocyanate mixture having a functionality of 2.0 and an equivalent weight of 125 g/equivalent available from The Dow Chemical Company. |
| VORANATE* T-80 | A toluene diisocyanate (80% 2,4-toluene diisocyanate and 20% 2,6-toluene diisocyanate by weight) composition, available from The Dow Chemical Company. |
| DABCO T-12 | A tin catalyst available from Air Products. |
| DBTA | Dibutyltin bis(acetylacetonate), Available from Sigma Aldrich Co. |
| DBTDL | Dibutyltin dilaurate, available from Aldrich. |
| SnAcAc | Tin (II) Acetylacetonate, available from |
| DBU | 1,8-Diazabicyclo[5.4.0]undec-7-ene, available from Aldrich. |
| Zn Octoate | Available from Shepherd Chemical Corporation. |
| SNAPCURE 3030 | A titanium based catalyst, available from Johnson Matthey plc. |
| TOYOCAT-DB30 | Acid blocked tertiary amine (1,8-Diazabicyclo[5.4.0]undec-7-ene) catalyst available from Tosoh Corporation. |
| DDBSA | Dodecyl benzene sulfonic acid. Available from Aldrich. |
| ANCHOR-1040 | A boron trifluoride amine complex. Available from Air Products. |

*ISONATE and VORANATE are trademarks of The Dow Chemical Company.

Test Methods

Tensile strength was measured according to ASTM standard test D1708. Elongation at break was measured according to ASTM standard test D1708. 100% Secant Modulus was measured according to ASTM standard test D1708. According to ASTM standard test D1708 four dog bone samples were prepared, and analyzed for mechanical properties. The results are reported as the average of the four samples with a standard deviation. The number average molecular weight was determined by gel permeation chromatograpy using PEG standards, according to ASTM standard test D5296. Viscosity was measured using a rheometer AR2000 by TA Instruments. Approximately 1 mL of sample was dispensed into a 60 mm diameter 60-degree cone and plate geometry. After removal of any excess material, the viscosity test was performed by heating the sample from 20° C. to 100° C. at 3° C./min Shear rate of the test was kept constant at 0.1 s$^{-1}$.

Hydrosilylation:

A hydrosilylation reaction was performed by charging Allyl monol 2 (343.20 g) into a 4-necked 250 mL pre-dried glass reactor equipped with a mechanical stirrer. Karstedt's catalyst (Approximately 0.03 g) was then added to the reactor and mixed for 2 minutes under a continuous nitrogen purge. Methyldimethoxysilane (50.02 g) was added last and mixed for 5 minutes before the entire reactor was heated to 60° C. for 2 hours. The hydrosilylation product (hereinafter referred to as Hydrosilylated Polyether) was analyzed using $^1$H-showing a hydrosilylation efficiency of >95%.

Prepolymer Synthesis (NCO Capping):

The Hydrosilylated Polyether was then reacted with excess ISONATE 50 OP or VORANATE T-80 in the presence of DABCO T-12 or Zn Octoate catalyst at 70° C. and at 300 rpm mixing speed for 5 hours to produce either a MDI or TDI prepolymers.

TABLE 1

| | MDI Prepolymer | TDI Prepolymer 1 | TDI Prepolymer 2 |
|---|---|---|---|
| Hydrosilylated Polyether (g) | 56.5 | 299.8 | 299.8 |
| ISONATE 50 OP (g) | 15.7 | | |
| VORANATE T-80 (g) | | 49.0 | 49.0 |
| DABCO T-12 (g) | | 0.015 | |
| Zn Octoate | 0.03 | | 0.015 |

Coupling and Curing

The proplymers obtained above were exposed to a coupling reaction, in which the prepolymers were reacted with polyols or polyoxyalkyleneamines in the presence of a catalyst at 70° C. according to the formulations and reaction times given in the following tables.

The curing of the materials was achieved by addition of SnAcAc, dodecyl DDBSA, or DB-30 acrylic acid blocked amine catalyst in the presence of moisture. The polyurea materials (based on JEFFAMINE D4000) were either liquefied at 75° C. and poured into moulds (E1 and E2) or films were drawn down (E3) on polypropylene sheets at 25 Mil and cured at 25° C. and 50% relative humidity for two weeks. For all other materials, films were drawn on polypropylene sheets at 25 Mil and cured at 25° C. and 50% relative humidity for two weeks.

Certain film samples were also submerged in water at 100° C. for 1 week, and the physical properties measured on surviving samples.

Examples E1-E3, polyoxyalkyleneamine polyol

| | E1 | E2 | E3 |
|---|---|---|---|
| Urethane Coupling Reaction | | | |
| MDI Prepymer (g) | | 25 | |
| TDI Prepolymer 2 (g) | 348.8 | | 25 |
| JEFFAMINE D4000 (g) | 463.2 | 43.21 | 34.9 |
| Zn Octoate (g) | 0.14 | 0.01 | 0.01 |
| Reaction time | 10 minutes | 10 minutes | 2 hours |
| Major GPC molecular weight peaks | 20148, 16713 | Solid | 9992, 5685 |
| Viscosity at 25° C.(cP) | 475000 | Solid | 7000 |
| Curing | | | |
| Silyl Polymer amount (g) | 12 | 12 | 12 |
| SnAcAc (g) | 0.05 | 0.05 | 0.05 |
| Secant Modulus (psi) | 26.8 ± 0.6 | 23.9 ± 3.0 | 2.5 ± 0.8 |
| Elongation at Break (%) | 288.1 ± 99.2 | 224.4 ± 17.4 | 1161.9 ± 73.9 |
| Tensile Strength (psi) | 55.7 ± 5.5 | 33.6 ± 2.5 | 31.5 ± 3.9 |

The polyoxyalkyleneamine polyol coupled silyl-terminated polymers show significantly faster set times compared to silylated urethane systems because of the faster reactivity of the amine vs. hydroxyl functionality with isocyanates. As can be seen in Example E2, the uncured silyl-terminated polymer is a solid at room temperature.

Examples E4-E6, polycarbonate polyol, and Comparative Examples CE1-CE3

|  | E4 | E5 | E6 | CE1 | CE2 | CE3 |
|---|---|---|---|---|---|---|
| Urethane Coupling Reaction |  |  |  |  |  |  |
| TDI Prepolymer 1 (g) | 348.8 | 348.8 | 348.8 | 348.8 | 348.8 | 348.8 |
| ACCLAIM Polyol 2200 (g) |  |  |  | 232 | 232 | 232 |
| DURANOL T5652 | 232 | 232 | 232 |  |  |  |
| DABCO T-12 (g) | 0.07 | 0.07 | 0.07 | 0.07 | 0.07 | 0.07 |
| Reaction time | 2 hours | 2 hours | 2 hours | 2 hours | 2 hours | 2 hours |
| Viscosity at 25° C.(cP) | 100000 | 100000 | 100000 | 5000 | 5000 | 5000 |
| Curing |  |  |  |  |  |  |
| Silyl Polymer amount (g) | 12 | 12 | 12 | 12 | 12 | 12 |
| SnAcAc (g) | 0.05 |  |  | 0.05 |  |  |
| DDBSA (g) |  | 0.02 |  |  | 0.02 |  |
| TOYOCAT-DB30 (g) |  |  | 0.05 |  |  | 0.05 |
| Secant Modulus (psi) | 9.3 ± 13.4 | 27.6 ± 2.7 | 47.6 ± 8.3 | 2.7 ± 0.9 | 10.5 ± 0.6 | 12.3 ± 1.7 |
| Secant Modulus after water treatment (psi) | Decomposed | Decomposed | 32.2 ± 4.3 | 29.1 ± 11.4 | 5.09 ± 0.25 | 3.4 ± 2.3 |
| Elongation at Break (%) | 78.3 ± 17.3 | 458 ± 27.2 | 163.8 ± 38.4 | 77.5 ± 15.4 | 406.6 ± 40.8 | 212.7 ± 22.6 |
| Elongation at Break after water treatment (%) | Decomposed | Decomposed | 250.4 ± 22.2 | 111.9 ± 10.2 | 570.8 ± 51 | 583.1 ± 70.2 |
| Tensile Strength (psi) | 85.7 ± 9.3 | 95.6 ± 10.8 | 68.4 ± 10.5 | 45.5 ± 3.6 | 31 ± 3.2 | 24.8 ± 2.5 |
| Tensile Strength after water treatment (psi) | Decomposed | Decomposed | 62.9 ± 9.5 | 44.1 ± 29 | 22.7 ± 3.3 | 20.1 ± 3.2 |

The polycarbonate polyol coupled silyl-terminated polymers cured using SnAcAc lose complete mechanical integrity when exposed to water at 100° C. for one week. However, the polycarbonate coupled silyl-terminated polymers cured using TOYOCAT-DB30 survive the water treatment. Furthermore, the polycarbonate coupled silyl-terminated polymers survive UV light exposure at 50° C. for 24 hours showing only slight yellowing, while the ACCLAIM (polyether polyol) coupled silyl-terminated polymers turned into liquid. The UV test was performed on films prepared on white drawdown plates. The samples containing the curing catalysts were poured onto the plates and cured for 1 week. The cured films were then exposed to the UV light in the UV chamber for 24 hours at 50° C.

Examples E7-E9, polybutyleneoxide polyether polyol, and Comparative Examples CE4 and CE5

|  | CE4 | CE5 | E7 | E8 | E9 |
|---|---|---|---|---|---|
| Urethane Coupling Reaction |  |  |  |  |  |
| TDI Prepolymer 1 (g) | 35 | 35 | 34.8 | 34.8 | 34.8 |
| ACCLAIM Polyol 4200 (g) | 48.8 | 48.8 |  |  |  |

-continued

| | CE4 | CE5 | E7 | E8 | E9 |
|---|---|---|---|---|---|
| BO polyol | | | 37.9 | 37.9 | 37.9 |
| DABCO T-12 (g) | 0.01 | 0.01 | 0.01 | 0.01 | 0.01 |
| Reaction time | 2 hours | 2 hours | 2 hours | 2 hours | 2 hours |
| Viscosity at 25° C.(cP) | 6000 | 6000 | 7000 | 7000 | 7000 |
| Curing | | | | | |
| Silyl Polymer amount (g) | 12 | 12 | 12 | 12 | 12 |
| SnAcAc (g) | 0.05 | | 0.05 | | |
| DDBSA (g) | | 0.02 | | 0.02 | |
| DB-30 (g) | | | | | 0.05 |
| Secant Modulus (psi) | 25.4 ± 1.6 | 6.5 ± 1.4 | 25.6 ± 4.12 | 7.7 ± 1.2 | 10.2 ± 0.5 |
| Secant Modulus after water treatment (psi) | 6.8 ± 0.3 | 2.6 ± 1.9 | 11.6 ± 1.2 | 2.2 ± 1.9 | 5.3 ± 1.7 |
| Elongation at Break (%) | 204.9 ± 43.4 | 714.9 ± 8.6 | 113.3 ± 35.8 | 649.4 ± 21.1 | 218.2 ± 27.7 |
| Elongation at Break after water treatment (%) | 262.1 ± 19.8 | 1002.4 ± 69 | 137.3 ± 33.2 | 918 ± 29.5 | 508.1 ± 58.6 |
| Tensile Strength (psi) | 45 ± 7.6 | 24.9 ± 0.7 | 30.8 ± 7.5 | 26.3 ± 0.6 | 17 ± 1.7 |
| Tensile Strength after water treatment (psi) | 17.3 ± 1.5 | 25.1 ± 3.6 | 21 ± 4.1 | 30 ± 4.5 | 30.2 ± 4.6 |

The polybutyleneoxide polyether polyol coupled silyl-terminated polymers survive UV light exposure at 50° C. for 24 hours showing only slight yellowing, while the ACCLAIM (polyether polyol) coupled silyl-terminated polymers turned into liquid.

Examples E10-E14, NOBP, and Comparative Examples CE6 and CE7

| | E10 | E11 | E12 | E13 | E14 | CE6 | CE7 |
|---|---|---|---|---|---|---|---|
| Urethane Coupling Reaction | | | | | | | |
| TDI Prepolymer 1 (g) | 34.9 | 34.9 | 34.9 | 34.9 | 34.9 | 35 | 35 |
| ACCLAIM Polyol 4200 (g) | | | | | | 48.8 | 48.8 |
| NOPB | 46.3 | 46.3 | 46.3 | 46.3 | 46.3 | | |
| DABCO T-12 (g) | 0.01 | 0.01 | 0.01 | 0.01 | 0.01 | 0.01 | 0.01 |
| Reaction time | 2 hours | 2 hours | 2 hours | 2 hours | 2 hours | 2 hours | 2 hours |
| Viscosity at 25° C.(cP) | 27000 | 27000 | 27000 | 27000 | 27000 | 6000 | 6000 |
| Curing | | | | | | | |
| Silyl Polymer amount (g) | 12 | 12 | 12 | 12 | 12 | 12 | 12 |
| SnAcAc (g) | 0.05 | | | | | 0.05 | 0.02 |
| DDBSA (g) | | | 0.005 | 0.02 | | | |

-continued

|  | E10 | E11 | E12 | E13 | E14 | CE6 | CE7 |
|---|---|---|---|---|---|---|---|
| DB-30 (g) |  |  |  |  | 0.05 |  |  |
| DB-41 |  | 0.05 |  |  |  |  |  |
| Secant Modulus (psi) | 14 ± 19.4 | 17.2 ± 0.6 | 5.4 ± 1.59 | 10 ± 1.22 | 13.7 ± 2.53 | 25.4 ± 1.6 | 6.5 ± 1.4 |
| Secant Modulus after water treatment (psi) | 42.8* | 24.1 ± 1.73 | ** | 9.43 ± 1.35 | 28.8 ± 0.47 | ** | ** |
| Elongation at Break (%) | 106.8 ± 50.77 | 233.8 ± 16. | 572.3 ± 63.4 | 322.3 ± 18.9 | 240.5 ± 4.93 | 204.9 ± 43.4. | 714.9 ± 8.6 |
| Elongation at Break after water treatment (%) | 124.6 ± 64.5 | 262.4 ± 34.4 | ** | 373 ± 30.6 | 217.95 ± 58.3 | ** | ** |
| Tensile Strength (psi) | 37 ± 11.34 | 41.5 ± 5.06 | 28.7 ± 3.95 | 31.8 ± 1.49 | 45.8 ± 9.03 | 45 ± 7.6 | 24.9 ± 0.7 |
| Tensile Strength after water treatment (psi) | 52.8 ± 20.9 | 53.2 ± 10.9 | ** | 34.9 ± 2.3 | 56.5 ± 13 | ** | ** |

*Only one of the four dog bone samples gave a numerical result with the other three samples giving no numerical value.
** The samples lost mechanical integrity, making measuring the physical properties unworkable.

While the foregoing is directed to embodiments of the present invention, other and further embodiments of the invention may be devised without departing from the basic scope thereof, and the scope thereof is determined by the claims that follow.

The invention claimed is:

1. A composition comprising a crosslinkable silane-terminated polymer having at least one crosslinkable silyl group in each molecule, wherein:
   the crosslinkable silane-terminated polymer comprises a reaction product of an isocyanate capped hydrosilylated polymer and at least one of a polycarbonate polyol having a nominal functionality of at least 2, a natural oil based polyol having a nominal functionality of at least 2, a polyoxyalkyleneamine having a nominal functionality of at least 2, a difunctional aromatic amine, a polybutyloxide polyether polyol having a nominal functionality of at least 2, and a polytetramethylene glycol having a nominal functionality of at least 2;
   the isocyanate capped hydrosilylated polymer comprises a reaction product of at least one isocyanate and a hydrosilylated polymer reacted at an isocyanate index of between about 100 and about 250; and
   the hydrosilylated polymer comprises a reaction product of a hydrosilylation reaction having a hydrosilylation efficiency of at least about 70% as determined by $^1$H-NMR and comprising the reaction of at least a) a polymer having at least one unsaturated group and at least one alcoholic hydroxyl group in each molecule and having a number average molecular weight of between about 100 and about 5000 and b) a compound having a hydrogen-silicon bond and a crosslinkable silyl group in each molecule.

2. A method of producing a composition comprising a crosslinkable silane-terminated polymer having at least one crosslinkable silyl group in each molecule, the method comprising:
   providing a polymer having at least one unsaturated group and at least one alcoholic hydroxyl group in each molecule and having a number average molecular weight of between about 100 and about 5000;
   adding to the polymer a compound having a hydrogen-silicon bond and a crosslinkable silyl group in each molecule and a hydrosilylation catalyst to thereby carry out a hydrosilylation reaction to form a composition comprising hydrosilylated polymers, wherein the hydrosilylation reaction has a hydrosilylation efficiency of at least about 70% as determined by $^1$H-NMR;
   capping the hydrosilylated polymers by exposing the hydrosilylated polymers to at least one isocyanate at an isocyanate index of between about 100 and about 250 to form a composition comprising isocyanate capped hydrosilylated polymers; and
   reacting the isocyanate capped hydrosilylated polymers with at least one of a polycarbonate polyol having a nominal functionality of at least 2, a natural oil based polyol having a nominal functionality of at least 2, a polyoxyalkyleneamine having a nominal functionality of at least 2, a difunctional aromatic amine, a polybutyloxide polyether polyol having a nominal functionality of at least 2, and a polytetramethylene glycol having a nominal functionality of at least 2, to form the composition comprising a crosslinkable silane-terminated polymer.

3. The method of claim 2, wherein the polymer having at least one unsaturated group and at least one alcoholic hydroxyl group in each molecule has a number average molecular weight of between about 200 and about 2000.

4. The method of claim 3, wherein the polymer having at least one unsaturated group and at least one alcoholic hydroxyl group in each molecule comprises a polyoxyalkylene polymer.

5. The method of claim 4, wherein the polymer having at least one unsaturated group and at least one alcoholic hydroxyl group in each molecule comprises a propylene glycol monoallyl ether having an OH number of between about 50 and about 90.

6. The method of claim 2, wherein the isocyanate index is between about 160 and about 200.

7. The method of claim 2, wherein the hydrosilylation efficiency is at least about 85%.

8. The method of claim 2, wherein the compound having a hydrogen-silicon bond and a crosslinkable silyl group comprises at least one of trimethoxysilane, triethoxysilane, methyldiethoxysilane, methyldimethoxysilane, phenyldimethoxysilane, trimethylsiloxymethylmethoxysilane and trimethylsiloxydiethoxysilane.

9. The method of claim 2, wherein the isocyanate comprises at least one of 4,4'-, 2,4' and 2,2'-isomers of diphenylmethane diisocyante, 2,4-toluene diisocyanate and 20% 2,6-toluene diisocyanate, or blends thereof.

10. The method of claim 2, wherein the crosslinkable silane-terminated polymer comprises the reaction product of the polycarbonate polyol.

11. The method of claim 10, wherein the polycarbonate polyol comprises a copolymer of 1,6-hexanediol and caprolactone and has a number average molecular weight of about 2000.

12. The method of claim 2, wherein the crosslinkable silane-terminated polymer comprises the reaction product of the natural oil based polyol.

13. The method of claim 12, wherein the natural oil based polyol comprises hydroxymethylated fatty acids or esters thereof reacted with an initiator.

14. The method of claim 2, wherein the crosslinkable silane-terminated polymer comprises the reaction product of the polyoxyalkyleneamine.

15. The method of claim 14, wherein the polyoxyalkyleneamine is defined by the general formula $H_2NCH(CH_3)CH_2O(CH_2CH(R)O)_nCH_2CH(CH_3)NH_2$, wherein R in each $CH_2CH(R)O$ unit is either H, forming an ethylene oxide unit, or $CH_3$, forming a propylene oxide unit, and n is be from about 1 to about 70.

16. The method of claim 2, wherein the crosslinkable silane-terminated polymer comprises the reaction product of the difunctional aromatic amine, which is selected from the group consisting of 4,4'-methylene bis-2-chloroaniline, 2,2', 3,3'-tetrachloro-4,4'-diaminophenyl methane, p,p'-methylenedianiline, p-phenylenediamine or 4,4'-diaminodiphenyl; and 2,4,6-tris(dimethylaminomethyl)phenol, 2,4-diethyl-6-methyl-1,3-benzenediamine, 4,4'-methylenbis(2,6-diethylbenzeneamine), dimethylthiotoluenediamine, and diethyltoluenediamine.

17. The method of claim 2, wherein the crosslinkable silane-terminated polymer comprises the reaction product of the polybutyloxide polyether polyol.

18. The method of claim 2, wherein the crosslinkable silane-terminated polymer comprises the reaction product of the polytetramethylene glycol.

19. The method of claim 2, wherein the crosslinkable silane-terminated polymer is cured with water to form a cured polymer.

20. An article comprising the polymer produced by the method of claim 19.

* * * * *